(12) United States Patent
Desai

(10) Patent No.: US 10,175,873 B2
(45) Date of Patent: Jan. 8, 2019

(54) SYSTEM AND METHOD FOR RETRIEVING DATA BASED ON SCROLLING VELOCITY

(71) Applicant: salesforce.com, inc., San Francisco, CA (US)

(72) Inventor: Sachin Desai, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 205 days.

(21) Appl. No.: 14/150,184

(22) Filed: Jan. 8, 2014

(65) Prior Publication Data

US 2014/0208259 A1 Jul. 24, 2014

Related U.S. Application Data

(60) Provisional application No. 61/754,697, filed on Jan. 21, 2013.

(51) Int. Cl.
*G06F 3/0485* (2013.01)
*G06F 3/0488* (2013.01)

(52) U.S. Cl.
CPC ........ *G06F 3/0485* (2013.01); *G06F 3/04883* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

"Using Windows Flip 3D", 2009.*

(Continued)

*Primary Examiner* — Jennifer N To
*Assistant Examiner* — Beau D Spratt
(74) *Attorney, Agent, or Firm* — Weaver Austin Villeneuve & Sampson LLP

(57) ABSTRACT

Disclosed are methods, apparatus, systems, and computer readable storage media for retrieving data while scrolling through a list of items in a user interface. A display device can display initial data of at least a first presentation of a first one or more items in a list of items. A user input can be received by the display device to cause scrolling through the list of items in the user interface. An initial scrolling velocity can be calculated responsive to the user input, and a second presentation of a second one or more items in the list of items that corresponds to an anticipated stopping of the scrolling can be predicted in accordance with the initial scrolling velocity and a deceleration rate. Data to be displayed in the second presentation can be retrieved before the stopping of the scrolling.

20 Claims, 5 Drawing Sheets

(56) References Cited

U.S. PATENT DOCUMENTS

| | | | |
|---|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,469,381 B2 * | 12/2008 | Ording .................. G06F 3/0485 |
| | | 715/702 |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,786,975 B2 * | 8/2010 | Ording .................. G06F 3/0485 |
| | | 345/156 |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,797,365 B2 * | 8/2014 | Imai .................. G09G 5/34 |
| | | 345/672 |
| 9,383,917 B2 * | 7/2016 | Mouton .............. G06F 3/04883 |
| 9,607,420 B2 * | 3/2017 | Adams .................. G06T 13/80 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2008/0313574 A1* | 12/2008 | Aravamudan .... G06F 17/30899 715/854 |
| 2009/0063415 A1 | 3/2009 | Chatfield et al. |
| 2009/0100342 A1 | 4/2009 | Jakobson |
| 2009/0100373 A1* | 4/2009 | Pixley ................. G06F 3/03543 715/786 |
| 2009/0106687 A1* | 4/2009 | De Souza Sana .... G06F 3/0481 715/784 |
| 2009/0119613 A1* | 5/2009 | Nakaya ................. G06F 3/0485 715/784 |
| 2009/0128500 A1* | 5/2009 | Sinclair ............... G06F 3/04883 345/173 |
| 2009/0177744 A1 | 7/2009 | Marlow et al. |
| 2010/0138776 A1* | 6/2010 | Korhonen ........... G06F 3/04883 715/786 |
| 2010/0194754 A1* | 8/2010 | Alsbury ................. G06F 3/017 345/440 |
| 2011/0072388 A1* | 3/2011 | Merrell ................. G06F 3/0485 715/784 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0042279 A1* | 2/2012 | Naderi ................ G06F 3/04855 715/786 |
| 2012/0072870 A1* | 3/2012 | Akifusa ................ G06F 3/0482 715/830 |
| 2012/0159393 A1* | 6/2012 | Sethi ................. G06F 17/30554 715/830 |
| 2012/0162267 A1* | 6/2012 | Shimazu ............. G06F 3/04883 345/684 |
| 2012/0233137 A1 | 9/2012 | Jakobson et al. |
| 2012/0266068 A1* | 10/2012 | Ryman ................. G06F 3/0485 715/719 |
| 2012/0290407 A1 | 11/2012 | Hubbard et al. |
| 2012/0311477 A1* | 12/2012 | Mattos ................. G06F 3/0485 715/777 |
| 2013/0055150 A1* | 2/2013 | Galor ...................... G09G 5/34 715/784 |
| 2013/0194307 A1* | 8/2013 | Matas ..................... G06T 11/60 345/634 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0238706 A1 | 9/2013 | Desai |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

SYSTEM AND METHOD FOR RETRIEVING DATA BASED ON SCROLLING VELOCITY

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PRIORITY DATA

This patent document claims priority to co-pending and commonly assigned U.S. Provisional Patent Application No. 61/754,697, titled "System and Method for Pre-Fetching Data Based on Scrolling Momentum," by Sachin Desai, filed on Jan. 21, 2013, which is hereby incorporated by reference in its entirety and for all purposes.

TECHNICAL FIELD

This patent document relates generally to retrieving data while scrolling through a list of items in a user interface and, more specifically, to techniques for retrieving data to be displayed in a presentation of one or more items in a list of items before the stopping of scrolling.

BACKGROUND

With increasing consumer demand for access to information over the Internet, efficient retrieval and delivery of information to users have become increasingly important. As data is retrieved over a network, the presentation of such data on user interfaces of electronic computing devices, including touch-sensitive display devices, has met some challenges. Particularly when large amounts of data are being retrieved, not all of the data can fit in a display area on a screen on a computing device such as a smartphone. In some instances, data can be rendered in one or more items in a list of items. If users want to view more data outside the display area, users can navigate through the list of items by scrolling.

BRIEF DESCRIPTION OF THE DRAWINGS

The included drawings are for illustrative purposes and serve only to provide examples of possible structures and operations for the disclosed inventive systems, apparatus, and methods for retrieving data while scrolling through a list of items in a user interface. These drawings in no way limit any changes in form and detail that may be made by one skilled in the art without departing from the spirit and scope of the disclosed implementations.

DETAILED DESCRIPTION

Figure 1:
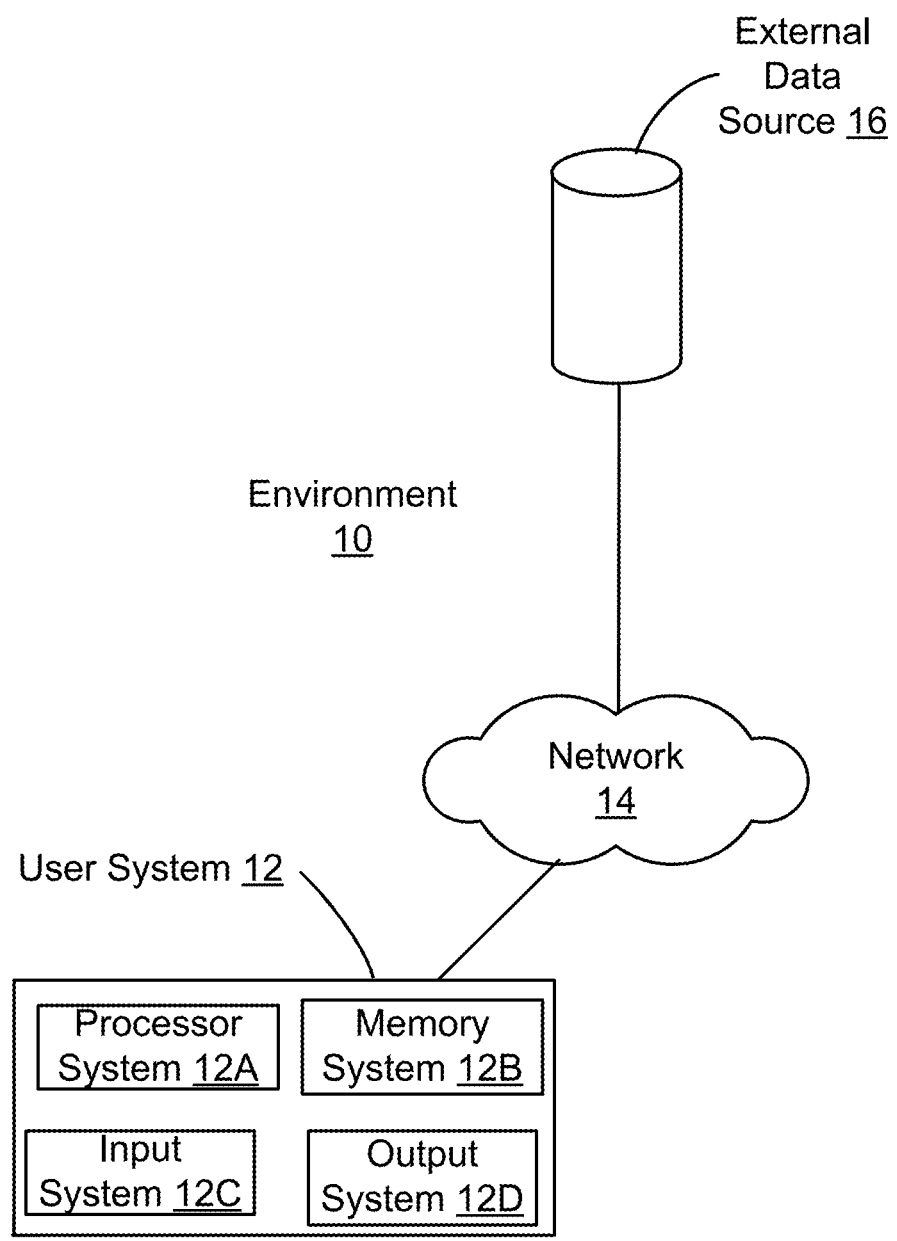
FIG. 1 shows a block diagram of an example of an environment in which a user system can interact with an external data source in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media configured to retrieve data while scrolling through a list of items in a user interface. A display device can display initial data of at least a first presentation of a first one or more items in a list of items. A user input can be received by the display device to cause scrolling through the list of items in the user interface. An initial scrolling velocity can be calculated responsive to the user input, and a second presentation of a second one or more items in the list of items that corresponds to an anticipated stopping of the scrolling can be predicted in accordance with the initial scrolling velocity and a deceleration rate. Data to be displayed in the second presentation can be retrieved before the stopping of the scrolling.

With increased demands for efficient retrieval and display of information on display devices, the disclosed methods, apparatus, systems, and computer-readable storage media can provide efficient retrieval and display of information by anticipating what one or more items a user will arrive at in a list of items before the stopping of scrolling when the scrolling velocity is fast. The disclosed methods, apparatus, systems, and computer-readable storage media can predict when a cutoff velocity is reached when items in the list of items can be perceived, and pre-fetch data for those items before that cutoff velocity is reached.

By way of an example, a user loads an application on a display device and queries a database for data. The database receives information over a network that the queried data includes 10,000 rows of data, where 10 rows of data fit per page, resulting in 1,000 pages of data. After a first page is loaded on a screen of the display device, the user scrolls through the rows of data on the first page and outside the first page. The scroll velocity is fast enough so that the rows of data are unintelligible to the user, but the scroll velocity slows down at a deceleration rate that emulates friction. Based on at least the scroll velocity and the deceleration rate, the display device predicts that the user will arrive at page 20 when the rows of data start becoming intelligible to the user. Instead of having the database load data for pages 2, 3, 4, 5, 6, 7, etc., the database can provide placeholder data. The database can place a request over the network for page 20 before the user arrives at page 20. In some instances, the database can place a request over the network for pages 19 and 21 as well. Rather than continually transmitting network requests for data that the user is quickly scrolling through, the display device can be configured to transmit network requests for data where the user is predicted to start perceiving the rows of data. This allows the user to continuously scroll through data without having to wait at the end of a data set for more data.

I. General Overview

Systems, apparatus, computer-readable storage media, and methods are provided for efficient retrieval of data in a display device while scrolling. Many presentations on a display device allow a user to scroll through large amounts of data. Depending on the amount of data downloaded over the network or provided locally on the display device, the user may have to wait for some period of time for the next set of data to be retrieved before it is displayed on the display device. Sometimes this retrieval is performed automatically (e.g., when a user reaches the end of the current set of data) or sometimes this retrieval is invoked manually (e.g., when a user selects "Show More" in the user interface). In either case, the user has to wait before being presented with more data.

Implementations described herein provide for retrieval of data while scrolling through displayed data. For example, the display device may have one or more processors configured to predict the anticipated point of stopping of scrolling when a user input action causes scrolling. The display device may request for retrieval of data over a network corresponding to before the anticipated point of stopping of scrolling. As a result, data may be displayed before the stopping of scrolling so that the user does not have to wait to retrieve data.

By way of an example, a user can request to view 1,000 feed items in a list of feed items in an information feed. The user can initiate scrolling through the list of feed items by a sweeping motion with a finger across a touch screen of a smartphone. The speed of the scrolling operation may be faster than what can be retrieved and loaded to the display area of the display device, leaving the user to have to wait at the end of a data set. If the scrolling operation is predicted to land on the 700th feed item, the smartphone can request to retrieve a data set that displays the 700th feed item rather than waiting to load 699 preceding feed items.

II. System Overview

FIG. 1 shows a block diagram of an example of an environment in which a user system can interact with an external data source in accordance with some implementations. Environment 10 may include user system 12, a network 14, and an external data source 16. The user system 12 may include processor system 12A, memory system 12B, input system 12C, and output system 12D. In some implementations, environment 10 may not have all of these components and/or may have other components instead of, or in addition to, those listed above.

User system 12 may be implemented as any computing device(s) or other data processing apparatus such as a machine or system that is used by a user to access an external data source 16. For example, a user system 12 can be a handheld computing device, a desktop computing device, a mobile phone, a laptop computer, a work station, and/or a network of such computing devices. As illustrated in FIG. 1, a user system 12 might interact via a network 14 with an external data source 16. In some implementations, the external data source 16 can be an on-demand database service. A multi-tenant database system, such as salesforce.com, is one example of an on-demand database service.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

A user system 12 might communicate with the external data source 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at external data source 16. Such an HTTP server might be implemented as the sole network interface between the external data source 16 and network 14, but other techniques might be used as well or instead. In some implementations, the network interface between external data source 16 and network 14 includes load sharing functionality, such as round-robin HTTP request distributors to balance loads and distribute incoming HTTP requests evenly over a plurality of servers.

Several elements in the environment 10 shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 may run an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user of user system 12 to access, process and view information, pages and applications available to it from external data source 16 over network 14. User system 12 may also communicate with the external data source 16 using TCP/IP or other appropriate network protocol that results in data transfer. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications, and other information provided by external data source 16 or other systems or servers. For example, the user interface device can be used to access data and applications hosted by external data source 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Non-transitory computer-readable media can have instructions stored thereon/in, that can be executed by or used to program a computing device to perform any of the methods of the implementations described herein. Computer program code implementing instructions for operating and configuring user system 12 as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems, Inc.).

Similarly, external data source 16 and all of its components might be operator configurable using application(s) including computer code to run using a processor system, which may be implemented to include a central processing unit, which may include an Intel Pentium® processor or the like, and/or multiple processor units. The external data source 16 can include a computing system with a processor and a memory unit that receives and stores data, such as online content. The external data source may transmit the stored data over the network 14 to the user system 12 upon receiving a request for the stored data.

In the user system 12, processor system 12A may be any combination of one or more processors. Memory system 12B may be any combination of one or more memory devices, short term, and/or long term memory. Input system 12C may be any combination of input devices, such as one or more keyboards, touch screens, mice, trackballs, scanners, cameras, and/or interfaces to networks. Output system 12D may be any combination of output devices, such as one or more monitors, printers, radio-frequency (RF) circuitry, and/or interfaces to networks.

III. Retrieving Data while Scrolling

Figure 2:
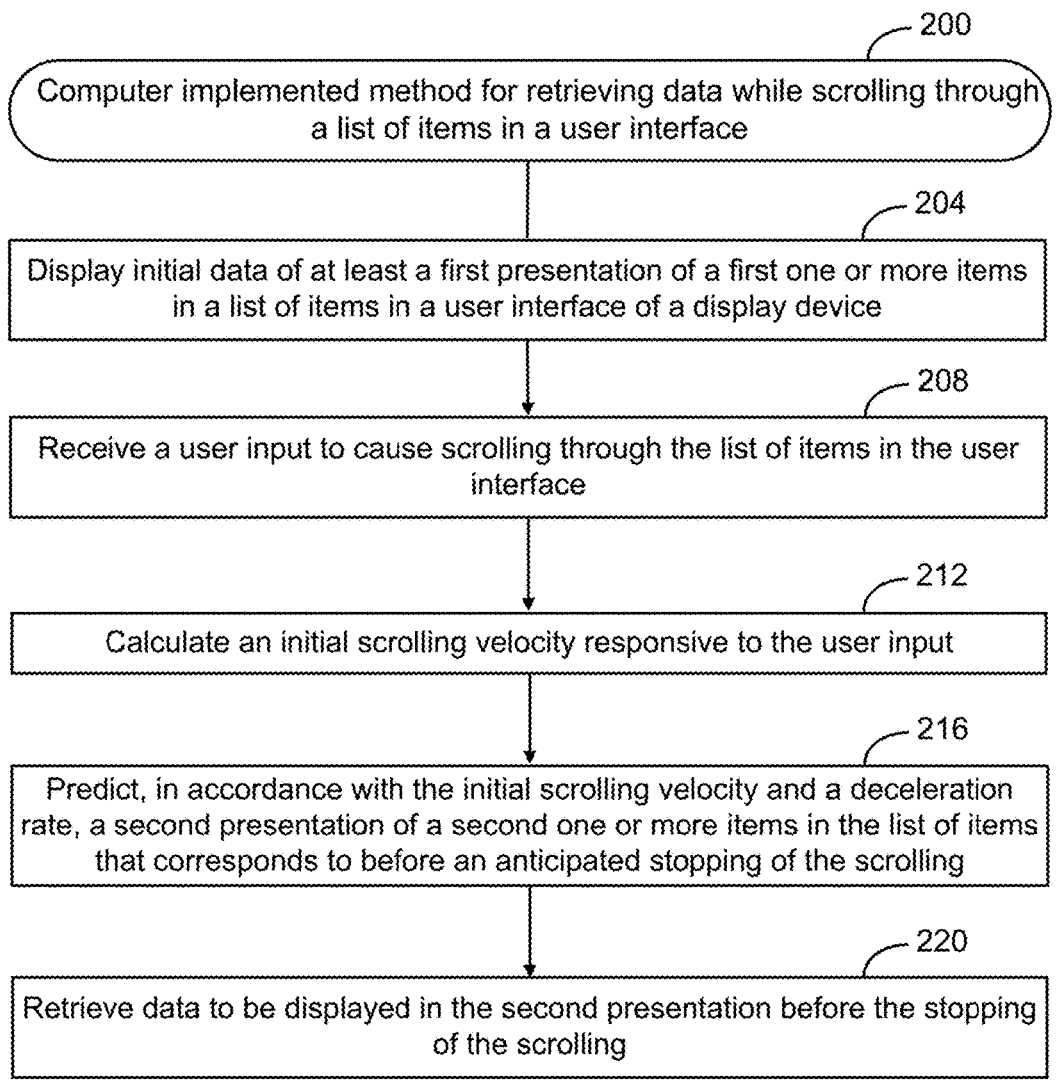
FIG. 2 shows a flowchart of an example of a computer implemented method for retrieving data while scrolling through a list of items in a user interface, performed in accordance with some implementations.

FIG. 2 shows a flowchart of an example of a computer implemented method for retrieving data while scrolling through a list of items in a user interface, performed in accordance with some implementations. Initial data can be displayed in a user interface of a display device, and the initial data can be presented in one or more items in a list of items. A user can navigate the list of items by scrolling. To cause scrolling, a user input action (e.g., a flick action on a touch screen) can cause scrolling so that the list of items can be scrolled through according to a calculated velocity. The velocity may slow down based on a deceleration rate that simulates a physical object experiencing friction. The display device predicts one or more items within the list of items that correspond to before an anticipated stopping of scrolling, and data is retrieved to be displayed for those one or more items before the stopping of scrolling.

At block 204 of the method 200, initial data of at least a first presentation of a first one or more items in a list of items is displayed in a user interface of a display device. In some implementations, the initial data may be retrieved from a database of the display device. Such data may be stored locally in the database of the display device. As used herein, data that is stored locally in the display device may be referred to as "buffered data." When an application is loaded, for example, one or more processors in the display device can make requests to retrieve buffered data from the database of the display device. The buffered data can provide at least the first presentation of the first one or more items in the list of items immediately upon request.

The list of items can correspond to a list of one or more elements that contain content. Examples can include but is not limited to a list of instant message conversations, a list of feed items, a list of email messages, a list of contact information (also referred to as a contact list or address book), a list of labels, a list of email folders, a list of ringtones, a list of album names, a list of email addresses, etc. Each of the items can include, by way of example, a text element, an image element, a video element, an audio element, a flash content element, an advertisement element, etc.

In some implementations, the list of items may be apportioned according to pages of data or other data set. A page can provide a layout for one or more items in the list of items based on dimensions of the page. Where items in a list have a uniform height dimension, each page can have a fixed number of items. In some implementations, the dimensions of a page can correspond to a display area of a display device. The display area can have dimensions that vary depending on the type of display device. However, a designer of an application can design the page dimensions to take up an entire width of the display area or a fraction of the display area. In some implementations, the dimensions of a page can be fixed, such as having a fixed number of pixels for its height and a fixed number of pixels for its width.

In some implementations, each item in the list of items can have a uniform height dimension for display in the user interface. The height dimension can be based on a vertical pixel count. A designer of an application can, for example, fix the height dimension of a list cell at 200 pixels for a smartphone and 300 pixels for a desktop computer. The width dimension can be predetermined according to the width of the display area of the display device. When the height of each item is uniform and fixed, the computation for constructing a layout of the list of items can be performed efficiently. However, if the height of each item is different, then how many items occupy each page is different. This requires additional computation for the layout of items for each page when data for each page is retrieved and can result in longer wait times.

When the height of each item is uniform, then the number of pages of data to be retrieved and the layout of each page can be quickly computed. The number of item in a list of items can be provided from a server side (e.g., external data source 16 in FIG. 1) and transmitted over to a client side (e.g., user system 12 in FIG. 1). The height dimension of each list item can be provided by an application on the client side.

The first presentation can be a first page having a position in a sequence of pages. When a request is made for the initial data from the database of the display device, the request can include a request to perform a refresh of the first page via a network connection. The request can occur via one or more processors of the display device, for example. The data that is retrieved via the network connection can be added to the database of the display device as buffered data. In some implementations, when the initial data is retrieved for the first presentation, the display device can compute the number of items in the list that will occupy the display area and retrieve data for those items prior to any scrolling operation.

In some implementations, data provided to the display device prior to scrolling can include the number of items in the list of items. If the number of items is greater than a threshold number of items, then the remainder of the operations in the method 200 can be implemented. In other words, if the number of items is too few, it may be unnecessary to calculate an initial scrolling velocity and predict one or more items that a user will reach that correspond to before an anticipated stopping of scrolling. For example, if only 3 pages of data are requested, then the data can be quickly retrieved for the items in the 3 pages of data without having to undergo the subsequent steps of the method 200.

At block 208 of the method 200, a user input is received to cause scrolling through the list of items in the user interface. The scrolling can be in response to various kinds of input actions. In one example, the input action can include activating an input control device, such as a mouse, touchpad, or other input device. In another example, the input action can include activating a display control icon, such as a slideable scroll bar, a control arrow, and so forth. In another example, the input action can include a voice-activated command. In another example, the input action can include a touch-based action, such as a sliding action, a drag action, or a flick action on a touch-sensitive display device. These actions can be performed with reference to one or more fingers, a stylus, or other object.

Certain actions, such as the flick action, can result in continued scrolling even after a user has released the mechanism that caused scrolling. The flick action can involve a user touching the touch-sensitive display device with the user's finger, dragging along a desired scroll direction, and lifting the finger from the touch-sensitive display device. Even after the finger is lifted, the scrolling of the list of items continues for some distance, where the amount of scrolling can depend on the velocity of the finger's drag action. Other input actions, such as the ones listed above, may also cause the same or similar effect. The direction of the scrolling may travel along a predefined axis in the display device that may correspond to the direction of the input action.

Figure 3:
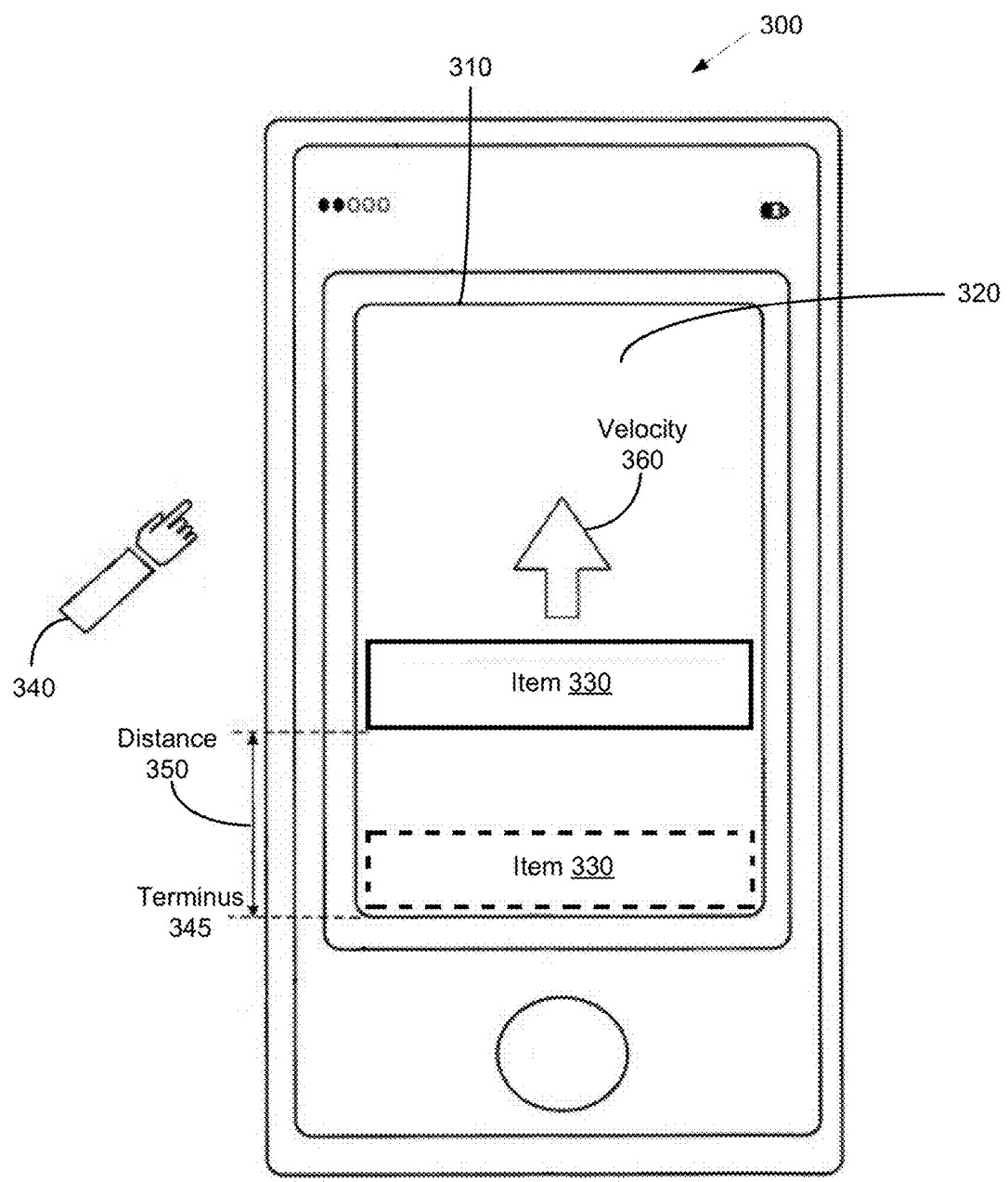
FIG. 3 shows an example of a user input action causing scrolling in a user interface of a display device.

FIG. 3 shows an example of a user input action causing scrolling in a user interface of a display device. A display device 300 can include a display area 310 displaying a list of items, including an item 330, in a user interface 320. The item 330 can be positioned proximate a terminus 345 of the display area 310. A user input action 340, such as a flick action on the display area 310 of the display device 300, can cause the list of items to be scrolled upwards or downwards in the user interface 320. As used herein, the terms "upwards" and "downwards" can signify directions relative to a top and bottom of the display device 300, though it may also signify directions relative to a left and right side of the display device 300, such as when the display device 300 is placed in a landscape orientation. In some instances, an application may have a user interface with a sideways (i.e., horizontally) scrollable list. In some instances, an application may include a vertically scrollable list, where one or more items in the vertically scrollable list may be horizontally scrollable. In the example in FIG. 3, the user input action 340 can cause the list of items, including item 330, to scroll upwards away from the terminus 345. The user input action 340 can cause the item 330 to move a distance 350 from its original position near the terminus 345. In some implementations, a velocity 360 can be determined based on the distance 350 and a time interval to travel the distance 350.

Returning to FIG. 2, at block 212 of the method 200, an initial scrolling velocity is calculated responsive to the user input. The initial scrolling velocity is calculated in accordance with the speed of the input action and the direction of the input action. In some implementations, once the user releases the mechanism that caused scrolling, the display device can calculate the initial scrolling velocity. One of more processors of the display device may record and perform the calculation. In some implementations, calculating the initial scrolling velocity can include determining a time interval corresponding to scrolling across a fixed distance, such as scrolling a distance across a first page. In some implementations, calculating the initial scrolling velocity can include calculating how many pixels, inches, or pages of data are scrolled through per unit time, such as per second, per millisecond, per microsecond, etc. For example, the display device may calculate that the user scrolled through 200 pixels within half a second. If the height of each list item is known, such as 50 pixels per item, then the display device can know that the scrolling speed is 4 list items per second. In some implementations, the initial scrolling velocity can be a time average of values determined during several time intervals.

After scrolling is caused by the user input, the display device continues scrolling through the list of items. Sometimes, the scrolling may be interrupted by another user input. In some instances, the scrolling may be interrupted by another user input action (e.g., flick action) that further accelerates the scrolling. A user can flick one or more fingers in the same direction as the scrolling. This can be performed one or more times while scrolling is occurring. In some instances the scrolling may be interrupted by another user input action that reverses the direction of scrolling. In either case, the initial scrolling velocity can be re-calculated at each point of contact. In some instances, the scrolling can be interrupted by a sudden stop. For example, following the release of one or more fingers in a flick action, the user can re-apply contact and hold the one or more fingers in one place on a screen of the display device to stop the scrolling.

In some implementations, the initial scrolling velocity can be compared to a threshold scrolling velocity. The threshold scrolling velocity can depend on the size of the buffered data and the rate at which additional data can be retrieved over the network. If the initial scrolling velocity is less than or equal to the threshold scrolling velocity, then the scrolling is proceeding slowly enough so that the rate at which data (e.g., buffered data) is being displayed in the user interface of the display device is sufficient so that a user does not reach a point in the display area where the user is waiting for data. In such instances, the one or more processors of the display device can retrieve and display buffered data from the database of the display device while asynchronously retrieving additional data over the network. Even when the buffered data is exhausted, the retrieved additional data can continuously update the buffer without causing the user to have to wait for more data while scrolling. What the user experiences can be referred to as an "infinite scroll" effect.

As data over the network comes in, the data may be stored locally in the database of the display device. In some implementations, requests for data to be displayed in the user interface of the display device can be through the database. If the database does not contain such data, then a request can be made through the network to retrieve such data. Nevertheless, data provided to the user interface may be configured to go directly through the database of the display device. That way, the data provided to the user interface can always be buffered data. This can allow for a relatively fast frame rate (e.g., greater than or equal to 60 frames per second) when a user re-accesses the data, because all the data being retrieved and displayed is local.

In some implementations, the initial scrolling velocity can be greater than the threshold scrolling velocity. In such instances, the buffered data can be exhausted quickly and the user can be left waiting for additional data to be retrieved and displayed. However, the display device may be configured to perform additional operations to avoid such waiting and to enable the user to continue to experience an infinite scroll effect.

At block 216 of the method 200, a second presentation of a second one or more items in the list of items that corresponds to before an anticipated stopping of the scrolling is predicted in accordance with the initial scrolling velocity and a deceleration rate. The deceleration rate can correspond to a deceleration rate that simulates a physical object experiencing friction. In some implementations, the deceleration rate is a fixed parameter that can be provided on a client side. For example, in iOS scrolling may last about 2.4 seconds before coming to a complete stop. The deceleration rate can be expressed as: $a=v_o/2.4$, where $v_o$ is the initial scrolling velocity. In some instances, the initial scrolling velocity can be calculated as: $v_o$=(pixels moved during swipe)/(time taken for swipe in seconds).

When the initial scrolling velocity and the deceleration rate are provided, a target scrolling velocity can be calculated after a certain time interval according to the following equation: $v_f = v_o + a\Delta t$. In the equation, "$v_o$" represents the initial scrolling velocity, "a" represents the deceleration rate, "$\Delta t$" represents the time interval, and "$v_f$" represents the final scrolling velocity. Alternatively, a time interval can be predicted given the initial scrolling velocity, final scrolling velocity, and deceleration rate. In some instances, the final scrolling velocity can be zero or at a velocity where content in a list of items is intelligible to the user.

When the time interval is known, the position that corresponds to reaching the final scrolling velocity can be predicted. For example, a scrolling distance can be predicted according to the following formula: $D = v_o \Delta t - (1/2)a(\Delta t)^2$. "D" represents the scrolling distance. In iOS implementations, substituting "a" with $v_o/2.4$ yields: $D = v_o(\Delta t - (1/4.8)\Delta t^2)$. Hence, the display device may request to retrieve the second one or more items in the list of items corresponding to the predicted scrolling distance D.

In some implementations, the anticipated stopping of the scrolling may correspond to when the final scrolling velocity is zero (i.e., $v_f=0$). Data may be retrieved before the anticipated stopping of the scrolling. Before the velocity reaches zero, the velocity is tapering due to the deceleration rate that simulates friction. Thus, it may be desirable to retrieve and display data not by the time scrolling stops, but by the time scrolling is slow enough for a user to be able to perceive data displayed in the user interface. The scrolling velocity that is slow enough for perception of displayed data may be arbitrarily set as a cutoff scrolling velocity. By way of an example, where an initial scrolling velocity is about 2,666 pixels per second, data may be intelligible to the user at about half way into the scroll, or when the velocity drops to about 1,466 pixels per second or less. The cutoff scrolling velocity may be set as $v_f$ in the above-referenced equation.

At block 220 of the method 200, data to be displayed in the second presentation is retrieved before the stopping of the scrolling. The one or more processors in the display device may request the data for the second presentation over the network. In some implementations, the request may be made over the network through the database of the display device so that the retrieved data can be buffered. In some implementations, the data to be displayed in the second presentation is retrieved before the cutoff velocity is reached.

In some implementations, placeholder data is provided in the list of items between the display of the first presentation and the display of the second presentation. Placeholder data can constitute "fake" data that can give the user the perception that data is available as the user is scrolling. Placeholder data can include objects that are computationally less complex to render than non-placeholder data (e.g., data retrieved over the network or retrieved locally). A computationally less complex object can include static images or outlines of static images instead of real images. A computationally less complex object can be an image that is displayed as part of a list item. A computationally less complex object can include data of a fixed size. That way, a fixed height can be provided in calculating the number of items scrolled in a given time.

In some implementations, placeholder data can include placeholder text contained in one or more items of the list of items. In some implementations, the placeholder data can serve as a placeholder where text, images, video, etc. are supposed to be rendered in the list of items. With placeholder data, the user can avoid experiencing a jerk action that may occur when data is loaded where the user is scrolling over or has already scrolled past. As the scrolling velocity exceeds a cutoff velocity, the placeholder data can be generated in the items that the user scrolls over. At such a fast scrolling velocity, the user need not distinguish or make sense of the items being displayed in the user interface. The items can be blurry or unintelligible to the eye. This enables the user to have an impression of scrolling past available text, images, video, etc., so that the user experiences a continuous or infinite scrolling list. However, in some instances, use of placeholder data may not be necessary depending on the scrolling velocity.

When the scrolling velocity reaches the cutoff velocity, the retrieved data for the second presentation can be displayed in the user interface. The data for the second presentation can be retrieved and displayed without using placeholder data. Accordingly, the method 200 can further include displaying the retrieved data in the second presentation in the user interface of the display device, and the display of the second presentation can occur before the stopping of the scrolling. In some instances the display of the second presentation can occur before reaching the cutoff scrolling velocity as described above.

The display device can avoid continually making network requests for data for each of the items the user is scrolling through. In some instances, the network requests can consume additional power and add more wait time, especially if the network component (e.g., RF circuitry) is starting up from a standby state. By implementing the method 200, the display device can focus on requesting data for items the user is going to arrive at when scrolling stops or when scrolling is slow enough for the presentation in the items to be intelligible to the user. This can reduce the wait times and reduce power consumption from excessive network requests.

The first presentation can be a first page having a position in a sequence of pages, and the second presentation can be a second page in the sequence. One or more third pages may be disposed between the first page and the second page in the sequence. In some implementations, the one or more third pages can include placeholder data. However, the display device can retrieve data for some of the one or more third pages before scrolling stops.

In some implementations, additional data may be retrieved of one or both of a preceding page and a subsequent page with respect to the second page. This retrieval may occur before the stopping of the scrolling. The additional data may be displayed in the user interface of the display device. It is possible that a user may be interested in adjacent pages when the user reaches the second page. Because the scrolling velocity is slow, the user may continue to scroll slowly through the items around the second page to find data that is relevant or interesting. Otherwise, the user may re-initiate fast scrolling that exceeds the threshold scrolling velocity to locate other more relevant or interesting items.

In some implementations, the retrieved data to be displayed the second presentation is stored in the database of the display device. The data can be stored locally so that when the second presentation is loaded at a subsequent time, the second presentation can be quickly loaded as buffered data without having to retrieve such data over the network.

With respect to the aforementioned display device for implementing the method 200, the display device can include any one of a number of display devices. For example, the display device can be one of a smartphone, a laptop, a tablet, a wearable display device, and a desktop computer. The wearable display device can include, for example, a smart watch or smart glasses.

In implementing the method 200, the display device may also be part of one or more connected devices. For example, the display device can be part of one of a vehicle, a consumer appliance, a sensor, a robot, and an electronic product.

Figure 4:
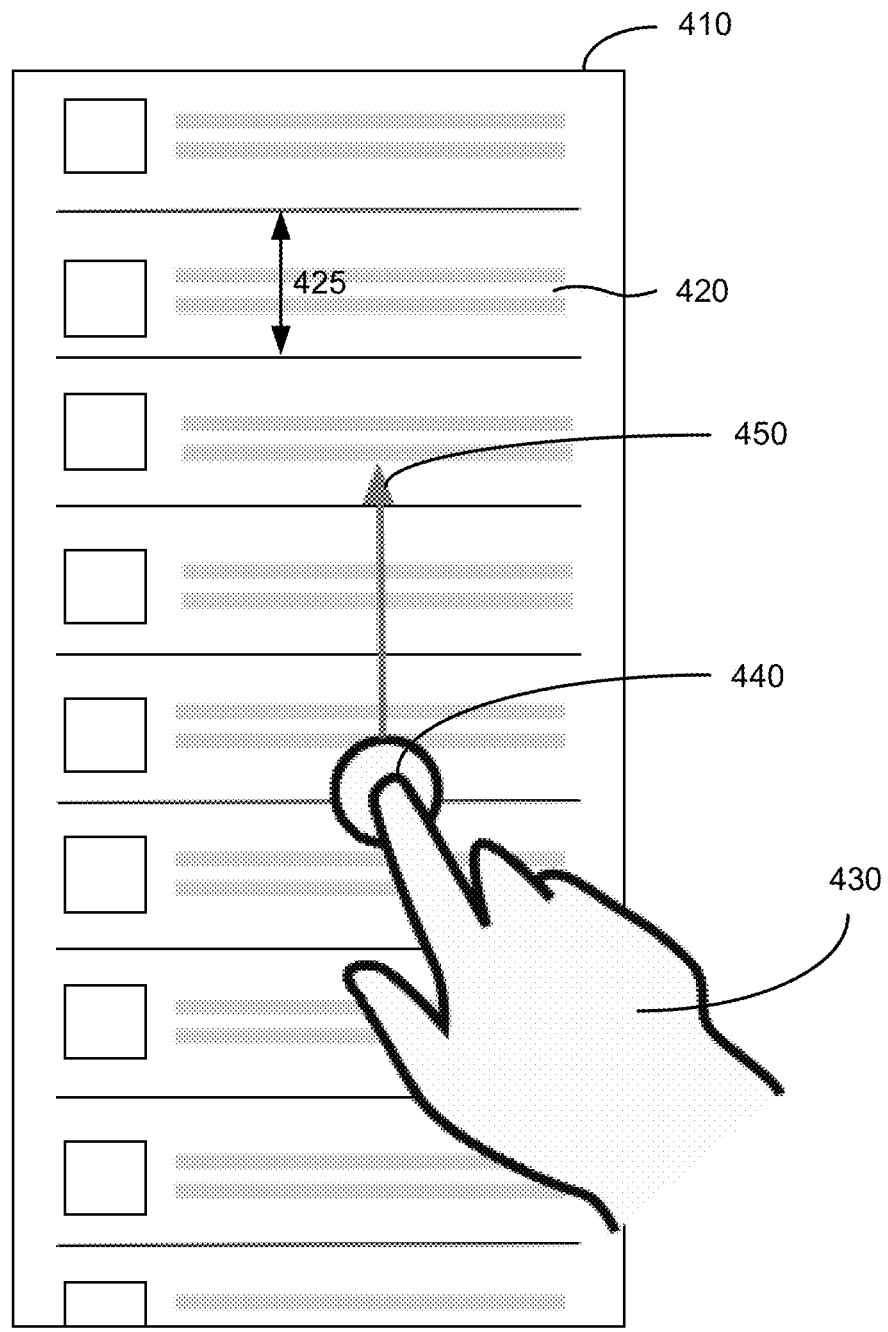
FIG. 4 shows an example of a user input action causing scrolling of a list of items in a user interface where the items have a uniform height dimension.

FIG. 4 shows an example of a user input action causing scrolling of a list of items in a user interface where the items have a uniform height dimension. The user interface 410 can have a list of items 420, where each of the items has a constant height 425. Each of the items 420 can include text data, image data, video data, etc. Scrolling through the list of items 420 can occur by a user input action. For example, a user 430 can apply a finger at a point of contact 440 with the user interface 410. The user 430 can cause scrolling upwards through the list of items 420 by sweeping upwards from the point of contact 440. The scrolling can have an initial velocity 450 corresponding to the speed and direction by which the items 420 travel across the user interface 410.

With a constant height 425, how each of the items 420 are laid out for each page can be efficiently computed. If the height 425 of each item is 200 pixels, and the size of a page is 20 items per page, then the display device can quickly compute what page a user will arrive at given an initial velocity 450 (e.g., 150 pixels per second) and a constant deceleration rate. When the scrolling is fast enough, the user interface 410 can display placeholder data in each of the items 420 until reaching a predicted page or pages in which the data is intelligible to the user 430.

Figure 5:
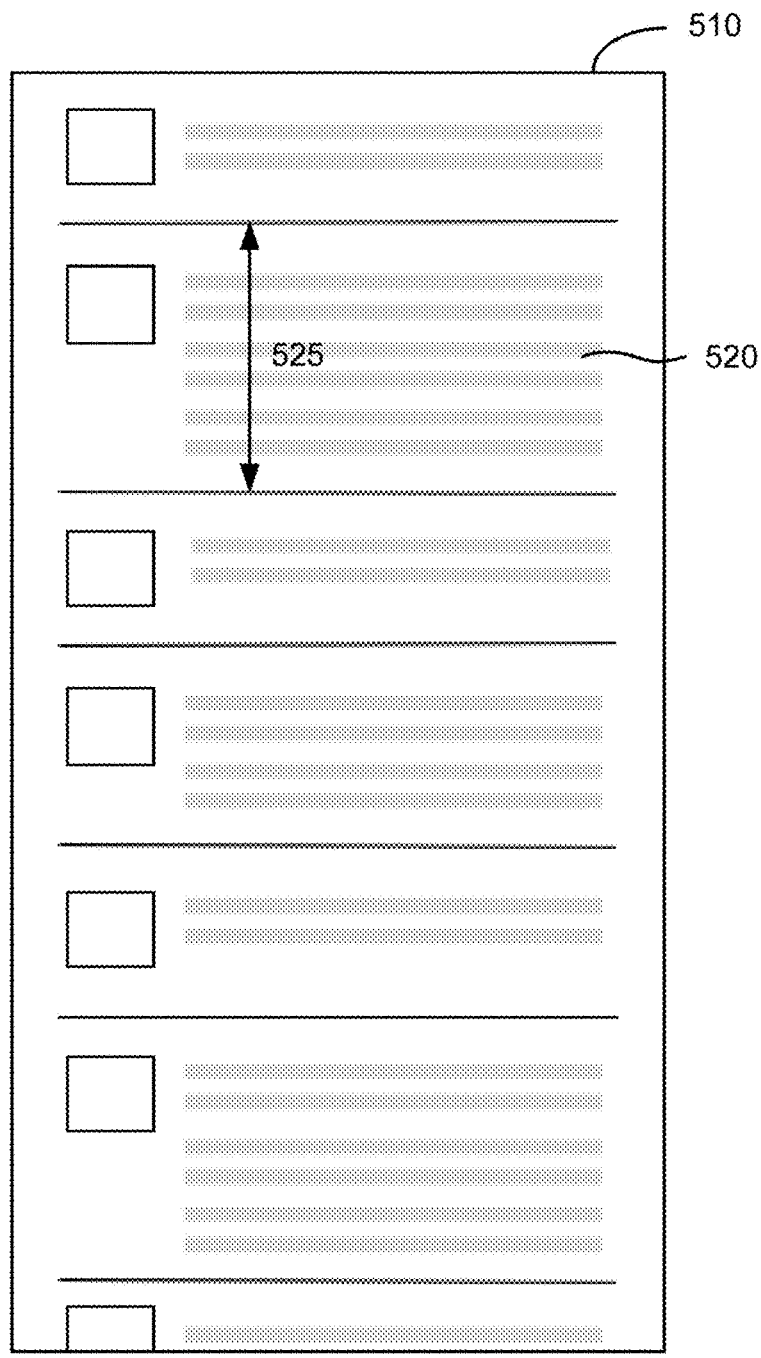
FIG. 5 shows an example of a list of items in a user interface where the items have varying height dimensions.

FIG. 5 shows an example of a list of items in a user interface where the items have varying height dimensions. The user interface 510 can include a list of items 520 with different height 525. Because the items 520 may be laid out differently for each page, computations for laying out the items 520 in each page may occur during scrolling or when scrolling comes to a stop. Specifically, the computations may be carried out when the data becomes intelligible to the human eye or when the scrolling comes to a stop. This can slow down the performance of an application on a display device.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples may be described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM® and the like without departing from the scope of the implementations claimed. The database architectures can be relational or include NoSQL databases such as MongoDB®.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer-implemented method comprising:
    causing display, in a user interface on a display of a device, of at least a first presentation of a first one or more items of a list of items, each item in the list of items having a uniform height dimension for display in the user interface;
    receiving, via the device, user input to cause scrolling of the list of items in the user interface on the display of the device;
    calculating an initial velocity of the scrolling;
    calculating, in accordance with the initial scrolling velocity, a deceleration rate of the scrolling;
    calculating, in accordance with the initial scrolling velocity and with the deceleration rate applied to a designated time interval, a cutoff velocity of the scrolling;
    determining one or more representations of one or more images in the list of items, the one or more representations being of a smaller data size than the one or more images;
    providing the one or more representations in placeholder data;
    determining that the initial scrolling velocity traverses a threshold scrolling velocity;
    responsive to determining that the initial scrolling velocity traverses the threshold scrolling velocity:
        causing display of the placeholder data as scrolling items in the user interface on the display of the device, and
        predicting, in accordance with the initial scrolling velocity applied to the designated time interval, with the deceleration rate applied to a multiple of the designated time interval, with the uniform height dimension, and with the number of items in the first one or more items, a scrolling distance corresponding to a second one or more items of the list of items;
    retrieving, before the cutoff scrolling velocity is reached, the second one or more items of the list of items; and
    causing display, in the user interface on the display of the device, responsive to the cutoff scrolling velocity being reached, of at least a second presentation of the second one or more items of the list of items.

2. The method of claim 1, wherein the placeholder data comprises placeholder text.

3. The method of claim 1, wherein the displaying of the second presentation occurs before stopping of the scrolling.

4. The method of claim 1, wherein the first presentation is a first page in a sequence of pages, and the second presentation is a second page in the sequence.

5. The method of claim 4, wherein one or more third pages are disposed between the first page and the second page in the sequence.

6. The method of claim 4, wherein calculating the initial scrolling velocity comprises:
    determining a time interval corresponding to scrolling across the first page.

7. The method of claim 4, further comprising:
    retrieving additional data of one or both of a preceding page and a subsequent page with respect to the second page; and
    causing display of the additional data in the user interface on the display of the device.

8. The method of claim 1, further comprising:
    storing the retrieved second one or more items of the list of items in a database of the device.

9. The method of claim 1, further comprising:
    retrieving the first one or more items of the list of items from a database of the device.

10. The method of claim 1, wherein the device is one of: a smartphone, a laptop, a tablet, a wearable display device, or a desktop computer.

11. The method of claim 1, wherein the device is part of one of: a vehicle, a consumer appliance, a sensor, a robot, or an electronic product.

12. A device comprising:
    a display; and
    one or more processors capable of executing one or more instructions configured to cause:
        displaying, in a user interface on the display of the device, at least a first presentation of a first one or more items of a list of items, each item in the list of items having a uniform height dimension for display in the user interface;
        obtaining user input to cause scrolling of the list of items in the user interface on the display of the device;
        calculating an initial velocity of the scrolling;
        calculating, in accordance with the initial scrolling velocity, a deceleration rate of the scrolling;
        calculating, in accordance with the initial scrolling velocity and with the deceleration rate applied to a designated time interval, a cutoff velocity of the scrolling;
        determining one or more representations of one or more images in the list of items, the one or more representations being of a smaller data size than the one or more images;
        providing the one or more representations in placeholder data;
        determining that the initial scrolling velocity traverses a threshold scrolling velocity;
            responsive to determining that the initial scrolling velocity traverses the threshold scrolling velocity:
            displaying the placeholder data as scrolling items in the user interface on the display of the device, and
            predicting, in accordance with the initial scrolling velocity applied to the designated time interval, with the deceleration rate applied to a multiple of the designated time interval, with the uniform height dimension, and with the number of items in the first one or more items, a scrolling distance corresponding to a second one or more items of the list of items;
        retrieving, before the cutoff scrolling velocity is reached, the second one or more items of the list of items; and
        displaying, in the user interface on the display of the device, responsive to the cutoff scrolling velocity being reached, of at least a second presentation of the second one or more items of the list of items.

13. The device of claim 12, the one or more instructions further configured to cause:

displaying the second presentation before the stopping of the scrolling.

14. A non-transitory computer-readable medium storing computer-readable program code executable by one or more processors, the program code comprising instructions configured to cause:

displaying, in a user interface on the display of the device, at least a first presentation of a first one or more items of a list of items, each item in the list of items having a uniform height dimension for display in the user interface;

obtaining user input to cause scrolling of the list of items in the user interface on the display of the device;

calculating an initial velocity of the scrolling;

calculating, in accordance with the initial scrolling velocity, a deceleration rate of the scrolling;

calculating, in accordance with the initial scrolling velocity and with the deceleration rate applied to a designated time interval, a cutoff velocity of the scrolling;

determining one or more representations of one or more images in the list of items, the one or more representations being of a smaller data size than the one or more images;

providing the one or more representations in placeholder data;

determining that the initial scrolling velocity traverses a threshold scrolling velocity;

responsive to determining that the initial scrolling velocity traverses the threshold scrolling velocity:

displaying the placeholder data as scrolling items in the user interface on the display of the device, and predicting, in accordance with the initial scrolling velocity applied to the designated time interval, with the deceleration rate applied to a multiple of the designated time interval, with the uniform height dimension, and with the number of items in the first one or more items, a scrolling distance corresponding to a second one or more items of the list of items;

retrieving, before the cutoff scrolling velocity is reached, the second one or more items of the list of items; and displaying, in the user interface on the display of the device, responsive to the cutoff scrolling velocity being reached, of at least a second presentation of the second one or more items of the list of items.

15. The non-transitory computer-readable medium of claim 14, the instructions further configured to cause:

displaying the second presentation before the stopping of the scrolling.

16. The non-transitory computer-readable medium of claim 14, wherein the placeholder data comprises placeholder text.

17. The non-transitory computer-readable medium of claim 14, wherein the first presentation is a first page in a sequence of pages, and the second presentation is a second page in the sequence.

18. The non-transitory computer-readable medium of claim 17, wherein one or more third pages are disposed between the first page and the second page in the sequence.

19. The non-transitory computer-readable medium of claim 17, wherein calculating the initial scrolling velocity comprises:

determining a time interval corresponding to scrolling across the first page.

20. The non-transitory computer-readable medium of claim 17, the instructions further configured to cause:

retrieving additional data of one or both of a preceding page and a subsequent page with respect to the second page; and causing display of the additional data in the user interface on the display of the device.

* * * * *